US012602063B2

(12) United States Patent
Okazaki

(10) Patent No.: US 12,602,063 B2
(45) Date of Patent: Apr. 14, 2026

(54) LOAD HANDLING SYSTEM AND LOAD HANDLING METHOD

(71) Applicant: NAKANISHI METAL WORKS CO., LTD., Osaka (JP)

(72) Inventor: Yoshihiro Okazaki, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 15 days.

(21) Appl. No.: 18/615,415

(22) Filed: Mar. 25, 2024

(65) Prior Publication Data

US 2024/0338038 A1     Oct. 10, 2024

(30) Foreign Application Priority Data

Apr. 4, 2023     (JP) ................................. 2023-060602

(51) Int. Cl.
| | |
|---|---|
| *G05D 1/648* | (2024.01) |
| *B65G 67/00* | (2006.01) |
| *B65G 69/28* | (2006.01) |
| *G05D 1/247* | (2024.01) |
| *B25J 5/00* | (2006.01) |
| *G05D 105/28* | (2024.01) |
| *G05D 111/10* | (2024.01) |

(52) U.S. Cl.
CPC ........... *G05D 1/6484* (2024.01); *B65G 67/00* (2013.01); *B65G 69/2864* (2013.01); *G05D 1/247* (2024.01); *B25J 5/00* (2013.01); *G05D 2105/28* (2024.01); *G05D 2111/10* (2024.01)

(58) Field of Classification Search
CPC ...... G05D 1/6484; G05D 1/247; G05D 1/021; G05D 1/0248; G05D 2105/28; G05D 2111/10; B65G 67/00; B65G 67/20; B65G 67/24; B65G 67/04; B65G 69/2864; B65G 69/28; B65G 47/904; B25J 5/007; B25J 5/00; B25J 9/023; B62D 63/02; B62D 63/04; G01B 2210/30
See application file for complete search history.

(56) References Cited

U.S. PATENT DOCUMENTS

| | | | | |
|---|---|---|---|---|
| 8,874,371 | B2 * | 10/2014 | Troy .................... | G05D 1/0276 |
| | | | | 901/1 |
| 9,272,417 | B2 * | 3/2016 | Konolige ............. | B25J 15/0616 |

(Continued)

FOREIGN PATENT DOCUMENTS

| | | | | | |
|---|---|---|---|---|---|
| CN | 103809184 A | * | 5/2014 | ............. | G01S 17/42 |
| CN | 111559411 A | * | 8/2020 | ........... | G01S 17/931 |

(Continued)

*Primary Examiner* — Truc M Do
*Assistant Examiner* — Noah W Stiebritz
(74) *Attorney, Agent, or Firm* — Kratz, Quintos & Hanson, LLP

(57) ABSTRACT

In a load handling system, a load handling operation is performed between a platform and the inside of a container of a container truck. A load handling device that performs the load handling operation includes a mobile robot including, on an unmanned transport vehicle, a robot with a robot arm capable of handling a load. A proper position display unit is installed outside the mobile robot and displays a proper position of the mobile robot relative to a position of the container of the truck. After aligning the mobile robot to the proper position, the mobile robot autonomously travels.

10 Claims, 9 Drawing Sheets

(56)          References Cited

U.S. PATENT DOCUMENTS

| 11,166,770 | B2 * | 11/2021 | DiMaio | .................. | B25J 9/1664 |
| 2021/0198090 | A1 * | 7/2021 | Bando | ..................... | B66F 9/063 |

FOREIGN PATENT DOCUMENTS

| JP | H0623101 | U | * | 3/1994 | | |
| JP | H11150972 | A | * | 6/1999 | ............ | H02K 11/00 |
| JP | 2002-073171 | A | | 3/2002 | | |
| JP | 3392523 | B2 | | 3/2003 | | |
| JP | 2004287711 | A | * | 10/2004 | | |
| JP | 2023008645 | A | * | 1/2023 | ............ | G05D 1/242 |

* cited by examiner

LOAD HANDLING SYSTEM AND LOAD HANDLING METHOD

FIELD

The present invention relates to a load handling system and a load handling method, for performing a load handling operation between a platform and the inside of a container of a container truck.

BACKGROUND

A load handling operation performed between a platform and the inside of a container of a so-called container truck (hereinafter, referred to as a "container vehicle") parked on a truck berth is carried out in a manner that a forklift and a transport device equipped with a table lifter part and a slope part are used, and the forklift enters the inside of the container (see Patent Literature (PTL) 1, for example).

Automation of the operation using robots is progressing in various fields such as logistics and production with the aim of solving labor shortages and improving operation efficiency. Examples of such robots include a mobile robot with a robot arm on an unmanned transport vehicle (see PTL 2, for example). If the mobile robot with such a configuration is used for the load handling operation, an unmanned transport vehicle can autonomously travel, and a load handling can be performed by the robot arm.

CITATION LIST

Patent Literature

[PTL 1] Japanese Patent No. 3392523
[PTL 2] Japanese Unexamined Patent Application Publication No. 2002-73171

SUMMARY

Technical Problem

When a load handling operation is performed by using a mobile robot equipped with a robot having a robot arm capable of handling loads on an unmanned transport vehicle, a container of a container vehicle and the mobile robot may be relatively misaligned in a direction (a left-right direction) that is parallel to the peripheral edge of a platform, which is close to a truck berth.

In that case, at the time of the load handling operation by the mobile robot, a space outside a movable range of the robot arm of the mobile robot is created in the container, which may cause the mobile robot to stop abnormally. Furthermore, there is a risk that the unmanned transport vehicle of the mobile robot stops abnormally during automatic traveling. If the mobile robot abnormally stops, it is assumed that a lot of time will be required for a recovery operation, which will increase a time of restraining a driver of the container vehicle.

An operator may measure a size of a positional misalignment of the mobile robot in the left-right direction relative to the container, and correct the positional misalignment by using a measurement result. In this case, it takes a lot of time to measure the positional misalignment, which increases the time of restraining a driver of the container vehicle. Furthermore, it is difficult to accurately measure the size of the positional misalignment in the left-right direction by using a sensor provided in the mobile robot.

It is an object of the present invention to provide a load handling system and a load handling method, which can efficiently correct a positional misalignment of the mobile robot in the left-right direction relative to a container of a container vehicle, when a mobile robot including, on an unmanned transport vehicle, a robot having a robot arm capable of handling loads is used for load handling between a platform and the inside of a container of a container vehicle.

Solution to Problem

A load handling system according to a first aspect of the present invention is a load handling system in which a load handling operation is performed between a platform and an inside of a container of a container truck. A load handling device that performs the load handling operation includes a mobile robot provided with, on an unmanned transport vehicle, a robot with a robot arm that can handle a load. A proper position display unit is installed outside the mobile robot, and displays a proper position of the mobile robot relative to a position of the container of the container truck. The mobile robot autonomously travels after being aligned to the proper position.

In a load handling system according to a second aspect of the present invention based on the load handling system of the first aspect, the proper position display unit: is installed on a stand or a floor surface, on which the mobile robot is placed; is movable in a left-right direction relative to a front with a direction parallel to a direction along which the mobile robot approaches the container being the front; and includes a first display that emits a first light toward the front and displays, when the first light hits a rear surface of the container, a position of the first light that has hit the rear surface, and a second display that emits a second light to the stand or the floor surface, and displays the proper position of the mobile robot relative to a position of the proper position display unit, the proper position of the mobile robot being a position at which the second light has hit the stand or the floor surface.

In a load handling system according to a third aspect of the present invention based on the load handling system of the second aspect, the proper position display unit further includes a third display that displays, when the proper position display unit is moved, a movement amount of the proper position display unit in the left-right direction relative to the front so that the position on the rear surface, at which the first light emitted from the first display toward the front has hit, is a predetermined position on the rear surface.

In a load handling system according to a fourth aspect of the present invention based on the load handling system of the first aspect, positioning of the mobile robot to the proper position relative to a position of the container includes movement of the mobile robot by a manual operation.

In a load handling system according to a fifth aspect of the present invention based on the load handling system of the fourth aspect, the mobile robot is provided with an obstacle sensor that functions during an automatic mode.

In a load handling system according to a sixth aspect of the present invention based on the load handling system of the first aspect, the proper position display unit has a function as a reflector that is referable as a reference position when the mobile robot travels autonomously. When a position of the proper position display unit relative to a position of the container is misaligned from a predetermined position in the left-right direction relative to a front with a direction parallel to a direction along which the mobile robot approaches the container being the front, the proper position display unit is moved in the left-right direction to be positioned at the predetermined position.

In a load handling system according to a seventh aspect of the present invention based on the load handling system of the first aspect, the proper position display unit: is installed on a stand or a floor surface, on which the mobile robot is placed; is movable in a left-right direction relative to a front with a direction parallel to a direction along which the mobile robot approaches the container being the front; includes a first display that emits a first light toward the front and displays, when the first light hits a rear surface of the container, a position of the first light that has hit the rear surface, and a second display that emits a second light to the stand or the floor surface, and displays a proper position of the mobile robot relative to a position of the proper position display unit, the proper position of the mobile robot being a position at which the second light has hit the stand or the floor surface; and has a function as a reflector that is referable as a reference position when the mobile robot moves autonomously.

In a load handling system according to an eighth aspect of the present invention based on the load handling system of the first aspect, the proper position display unit is installed on a movable stand on which the mobile robot is mounted, and a state of the movable stand is switchable between an immovably fixed state and a movable state in which the movable stand is movable in a left-right direction relative to a front with a direction parallel to a direction along which the mobile robot approaches the container being the front.

In a load handling system according to a ninth aspect of the present invention based on the load handling system of the eighth aspect, the movable stand includes a stopper-equipped caster, the movable stand is fixed immovably by actuating the stopper, and the movable stand is allowed to be freely movable in a front-rear direction and a left-right direction, by releasing the stopper.

A load handling method according to a tenth aspect of the present invention is a load handling method for performing a load handling operation between a platform and an inside of a container of a container truck. A load handling device that performs the load handling operation includes a mobile robot provided with, on an unmanned transport vehicle, a robot with a robot arm that can handle a load. The method comprising: causing a proper position display unit to emit a first light, the proper position display unit being installed on a stand or a floor surface, on which the mobile robot is placed, the proper position display unit being movable in a left-right direction relative to a front with a direction parallel to a direction along which the mobile robot approaches the container of the container track being the front, and causing the proper position display unit to move in the left-right direction so that a position at which the first light has hit is a predetermined position on a rear surface of the container, when the position at which the first light has hit the rear surface is not the predetermined position on the rear surface; causing the proper position display unit to emit a second light to the stand or the floor surface, and causing the proper position display unit to display a proper position of the mobile robot relative to a position of the proper position display unit, the proper position of the mobile robot being a position at which the second light has hit the stand or the floor surface; causing the mobile robot to move to the proper position displayed on the stand or the floor surface; and allowing the mobile robot to autonomously travel into the container to perform the load handling operation.

Advantageous Effects

In a load handling system and a load handling method according to the present invention, a load handling device that performs a load handling operation between a platform and the inside of a container of a container truck includes a mobile robot provided with, on an unmanned transport vehicle, a robot with a robot arm that can handle a load. A proper position display unit is installed outside the mobile robot, and displays a proper position of the mobile robot relative to a position of the container of the container truck. The mobile robot autonomously travels after being aligned to the proper position.

Even when the mobile robot and the container of the container truck parked on a truck berth are relatively misaligned in a direction parallel to the peripheral edge of a platform, which is close to the truck berth, the movable robot can be quickly aligned to a proper position relative to a position of the container by using the proper position display unit. Then, the mobile robot aligned to the proper position relative to the position of the container autonomously travels and enters the inside of the container to perform the load handling operation.

Therefore, abnormal stoppage of the mobile robot that autonomously travels and performs the load handling operation can be prevented in a case where the container and the mobile robot are relatively misaligned in a direction parallel to the peripheral edge of the platform, which is close to the truck berth. Thus, increase in the time of restraining a driver of the container vehicle can be prevented.

DESCRIPTION OF EMBODIMENTS

Figure 1:
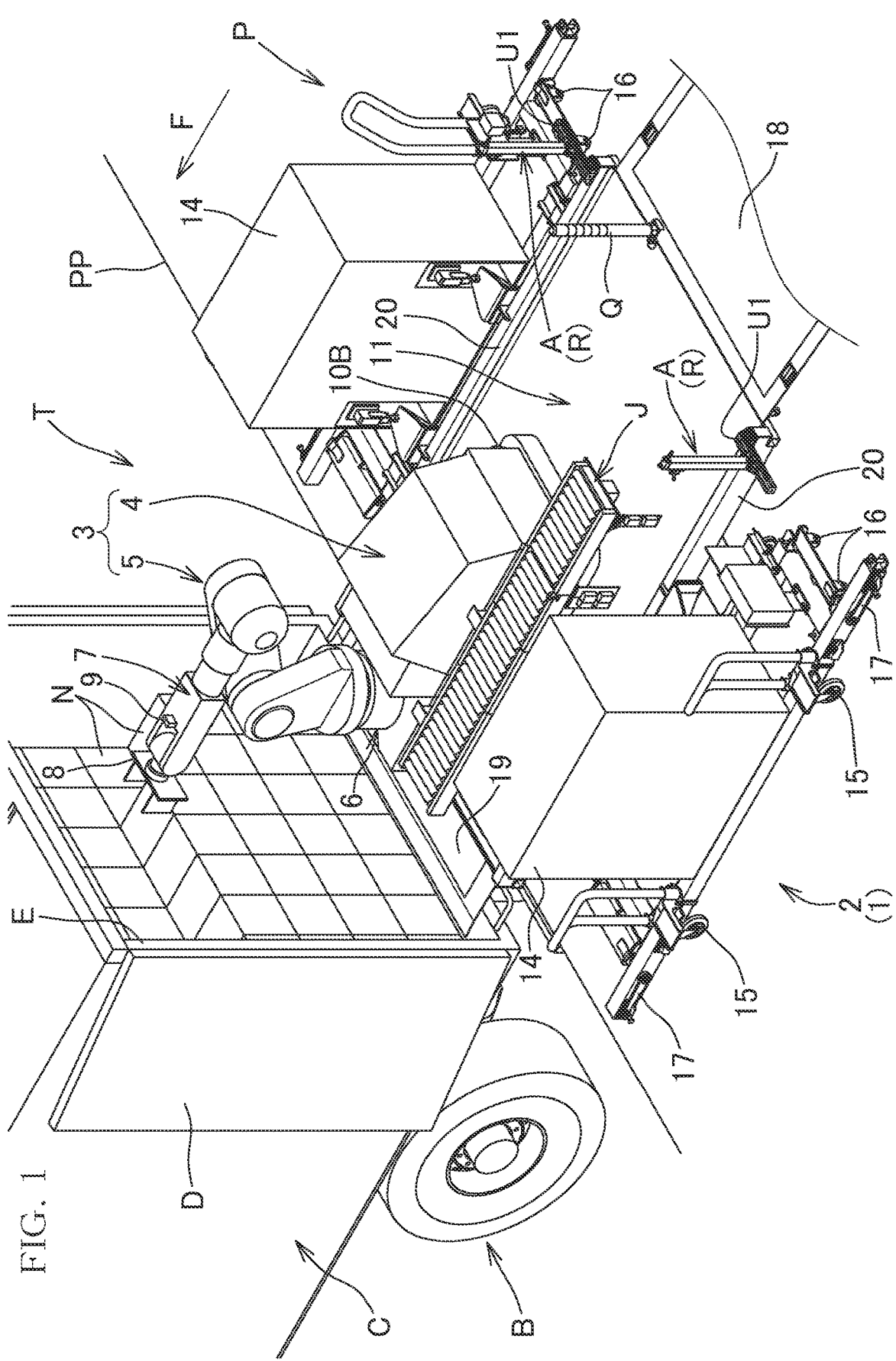
FIG. 1 is a perspective view showing an overview of an example in which a load handling system according to an embodiment of the present invention performs an operation of taking a load out from a container.

Hereinafter, embodiments of the present invention are described with reference to the drawings.

In the following embodiments, a direction parallel to a direction from a platform P toward a container C of a container truck B parked on a truck berth T (a direction along which a mobile robot 3 approaches the container C) is a front (an arrow F in the drawings indicates a direction toward the front). The left and right are defined relative to the front F. In other words, the left-right direction is a direction parallel to a peripheral edge PP of the platform P, which is close to the track berth T.

<Load Handling System and Load Handling Device>

A load handling system 1 shown in FIG. 1 performs a load handling operation between the platform P and the inside of the container C of the container truck B that is parked on the truck berth T. A load handling device 2 that performs the load handling operation includes a mobile robot 3, an extendable conveyor (not shown) that is extendable in a front-rear direction, a movable stand 11, and the like. FIG. 1 shows an overview of an example of the operation of taking loads N out from the container C.

<Container>

The container C is manufactured in accordance with the international standard ISO 668:2020, and is the most standard so-called marine container (ISO container). The width of the container C is 8 feet (2,438 mm). In the container C, a rear door D can be opened and closed.

<Mobile Robot>

Figure 2:
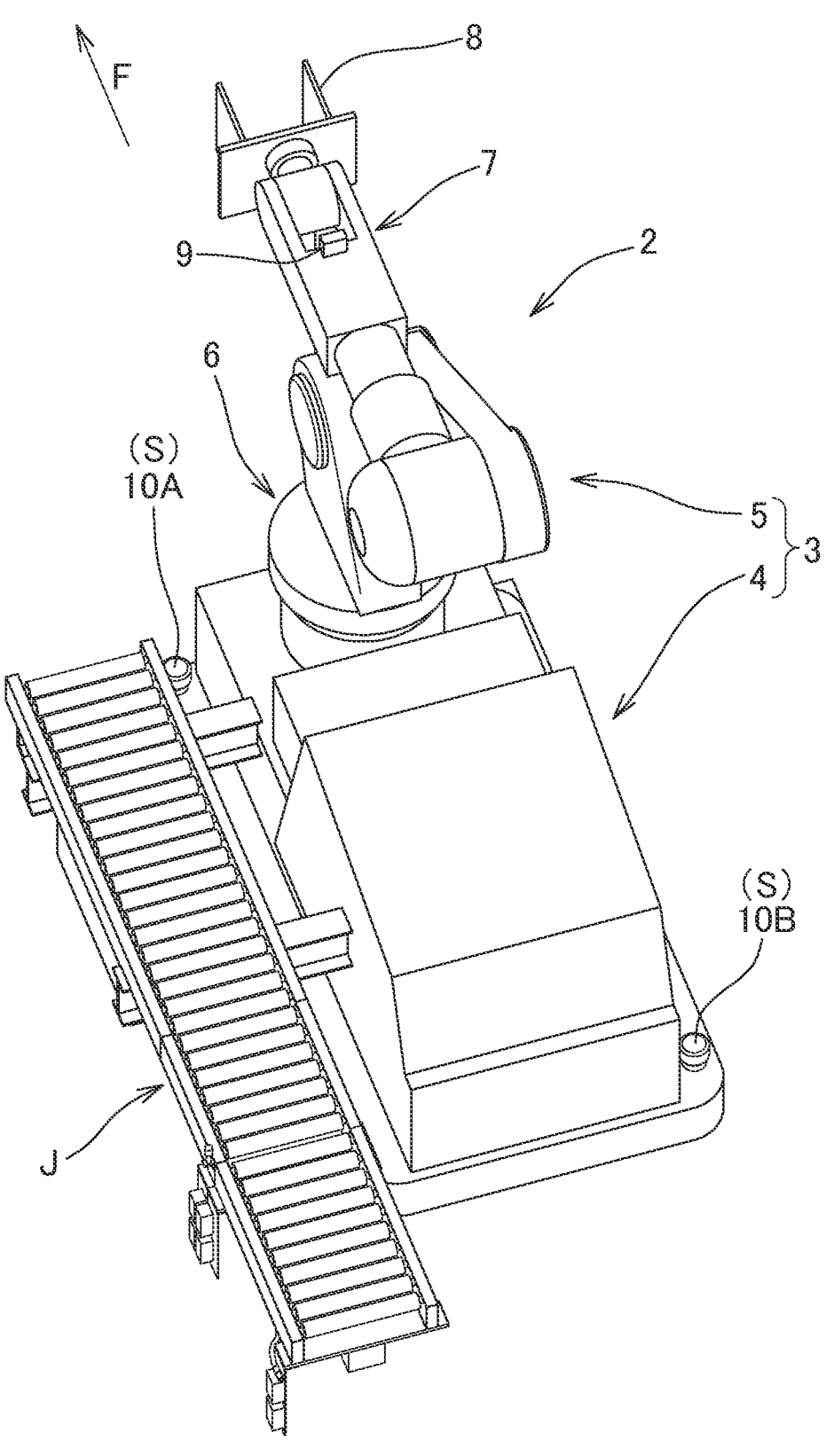
FIG. 2 is a perspective view showing a mobile robot in which a robot having a robot arm capable of handling loads is mounted on an unmanned transport vehicle.

As shown in FIGS. 1 and 2, the mobile robot 3 is equipped with a robot 5 on an unmanned transport vehicle 4 and includes a vehicle-mounted conveyor J. The unmanned transport vehicle 4 is in an autonomous mobile type and has a self-position estimation function to estimate a self-position in an environment map. The robot 5 has a robot arm 7 that can handle the loads N.

<Unmanned Transport Vehicle>

As shown in FIG. 2, the unmanned transport vehicle 4 includes laser scanners 10A and 10B. The laser scanner 10A is attached around a left front corner of the unmanned transport vehicle 4, and the laser scanner 10B is attached around a right rear corner of the unmanned transport vehicle 4.

As the laser scanner, light detection and ranging (LiDAR) can be used, for example. According to such a laser scanner, a surrounding area is scanned with a laser light, and the time until the laser light is reflected and returned is measured, thereby obtaining shapes and distances of surrounding objects and obstacles. Therefore, it is possible to detect the surrounding obstacles by using the laser scanner.

The unmanned transport vehicles 4 can perform so-called simultaneous localization and mapping (SLAM) traveling based on data obtained by the laser scanners 10A and 10B. Specifically, the unmanned transport vehicle 4 autonomously travels by creating an environment map (Mapping) based on the data obtained by the laser scanners 10A and 10B, and estimating a self-position (Localization). In this way, each of the laser scanners 10A and 10B have a function as an obstacle sensor S for detecting obstacles and a function as a SLAM traveling sensor.

<Robot>

As shown in FIGS. 1 and 2, the robot 5 is, for example, of a vertical multi-joint type including a pivot 6 and a robot arm 7. The robot 5 includes a robot hand 8 for the load handling operation and a camera 9. The camera 9 images the loads N that are targets of handling.

<Vehicle-Mounted Conveyor>

A vehicle-mounted conveyor J shown in FIGS. 1 and 2 can transport the loads N in the front-rear direction, and is a roller conveyor, for example. The vehicle-mounted conveyor J transports the loads N that are placed in front of the vehicle-mounted conveyor J by the robot 5 to a rear extendable conveyor (not shown) connected to the vehicle-mounted conveyor J. Alternatively, the vehicle-mounted conveyor J transports the loads N sent from the extendable conveyor to a forward position where the loads N can be handled by the robot arm 7.

<Movable Stand>

Figure 3:
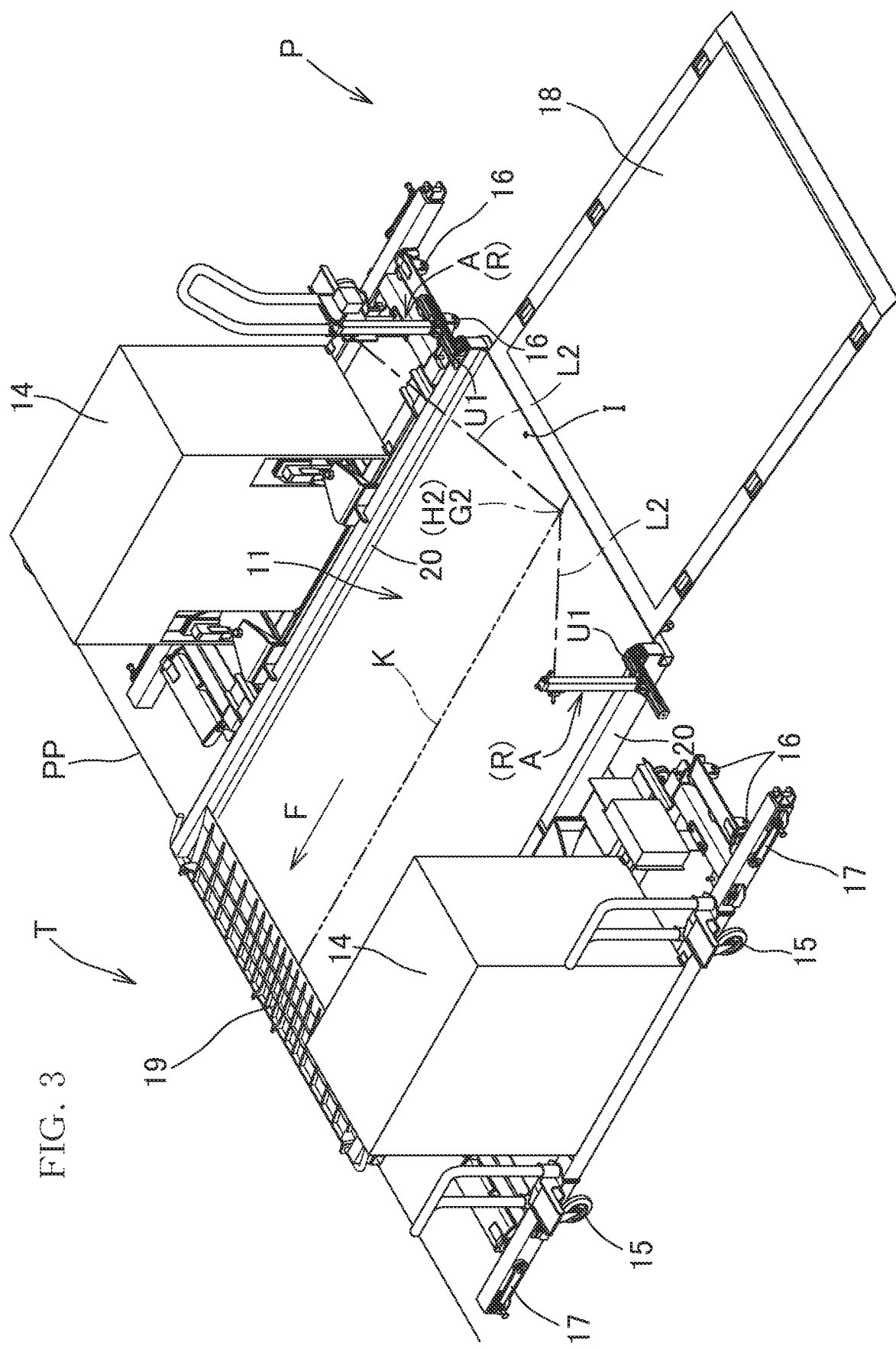
FIG. 3 is a perspective view showing a movable stand.

The movable stand 11 shown in FIGS. 1 and 3 includes a lifting device 14, stopper-equipped casters 15, traversing wheels 16, operating handles 17, and the like. The movable stand 11 can be freely moved on the platform P in the front-rear direction, left-right direction, etc., and is positioned and fixed to a predetermined position.

A part of the movable stand 11, on which the mobile robot 3 is placed, is lifted and lowered by the lifting device 14. Accordingly, a height of the movable stand 11 can be adjusted to a height of the floor surface of the container C. The lifting device 14 is provided not below the part of the movable stand 11, on which the mobile robot 3 is placed, but on the left and right sides of the part on which the mobile robot 3 is placed. Accordingly, the part of the movable stand 11, on which the mobile robot 3 is placed, can be lowered, so that the height of the part on which the mobile robot 3 is placed can be easily adjusted to the height of the floor surface of the container C.

In the movable stand 11 shown in FIG. 3, the stopper-equipped casters 15 are in contact with the platform P, and the traversing wheels 16 are floating. In this state, the stopper of each of the casters 15 is released, allowing the movable stand 11 to be freely moved in the front-rear direction, left-right direction, etc. The stopper is operated after moving the movable stand 11, so that the movable stand 11 is fixed at a position after the movement.

The operating handles 17 shown in FIG. 3 are operated, thereby switching states of the movable stand 11 between a state in which the casters 15 touch the ground and the transversing wheels 16 float, and a state in which the transversing wheels 16 touch the ground and the casters 15 float.

In other words, when the operating handles 17 are rotated 180 degrees from the state shown in FIG. 3 and are fixed, for example, the casters 15 float and the transversing wheels 16 touch the platform P. In this state, the movable stand 11 can be moved in the left-right direction by the traversing wheels 16.

After moving the movable stand 11 in the left-right direction, the operation handles 17 are rotated in the opposite direction to be returned to the original position and fixed. With this operation, the traversing wheels 16 float and the casters 15 touch the platform P. The stoppers of the casters 15 are operated, thereby causing the movable stand 11 to be fixed at that position.

As described above, the state of the movable stand 11 can be easily switched between three states. The three states includes: a state in which the transversing wheels 16 are floated, the stopper-equipped casters 15 are grounded, and the stoppers are released, allowing the movable stand 11 to be moved freely in the front-back and left-right directions; a fixed state in which the stopper-equipped casters 15 are grounded and the stoppers are actuated; and a state in which the stopper-equipped casters 15 are floated and the transversing wheels 16 are grounded, allowing the movable stand 11 to be moved in the left-right direction.

As shown in FIGS. 1 and 3, the part of the movable stand 11, on which the mobile robot 3 is placed, is a horizontal surface, and the mobile robot 3 is placed on the horizontal surface via a slope 18. The mobile robot 3 that performs, during autonomous traveling, a load handling operation between the platform P and the inside of the container C starts the autonomous traveling at a certain position. The position needs to be on a horizontal surface in order to eliminate a risk of interfering with the load handling operation.

In other words, if the mobile robot 3 that performs the load handling operation during autonomous traveling starts the autonomous traveling on a slope, an inclination angle of a body of the unmanned transport vehicle 4 needs to be detected, and a detection result needs to be considered when estimating the self-position. For example, a distance to the reflector is different between a case where the vehicle body is located on a horizontal surface and a case where the vehicle body is located on an inclined surface. In such a case, it is necessary to perform correction. This may cause accuracy in the self-position estimation to deteriorate due to a reason such as an inability to correctly detect the inclination of the vehicle body. If the accuracy of the self-position estimation deteriorates, the load handling operation is hindered.

\<Proper Position Display Unit\>

Figure 4:
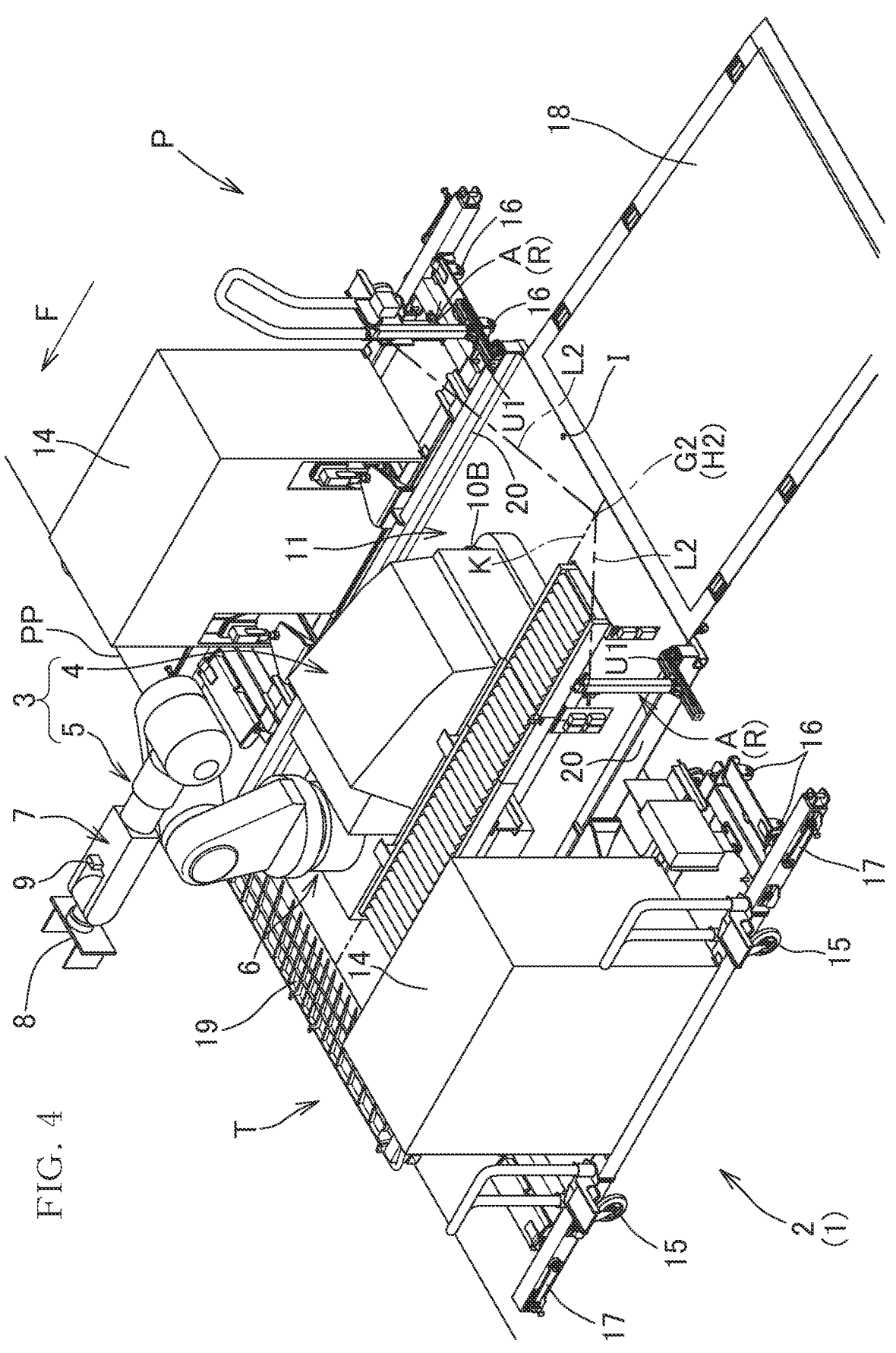
FIG. 4 is a perspective view showing a state in which the mobile robot has been moved to a proper position on a movable stand, relative to a position of a proper position display unit.
Figure 5:
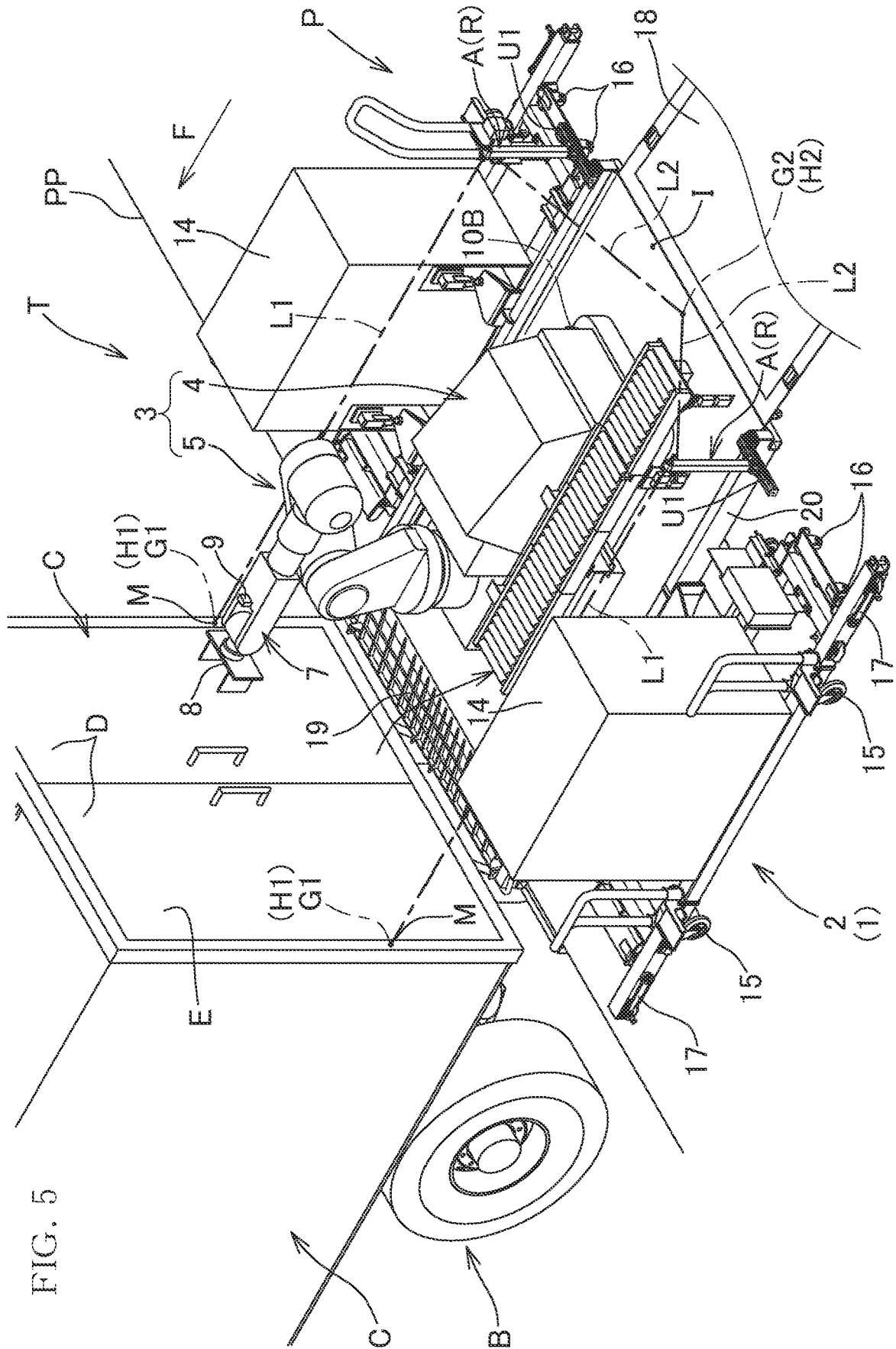
FIG. 5 is a perspective view showing a state in which the mobile robot has been moved to a proper position of the mobile robot, relative to a position of the container by using the proper position display unit.

As shown in FIGS. 3 to 5, proper position display units A are respectively installed on the left and right sides of the part of the movable stand 11, on which the mobile robot 3 is placed. Each of the proper position display units A is supported by a left-right linear guide U1 shown in FIGS. 3 to 6. Each of the linear guides U1 is attached to each frame 20 on the left and the right of the part of the movable stand 11, on which the mobile robot 3 is placed. Therefore, the proper position display units A are movable in the left-right direction relative to the part of the movable stand 11, on which the mobile robot 3 is placed.

The proper position display units A are respectively arranged at rear parts of the movable stand 11. One reason for this is that the front part of the movable stand 11 is set as a safe area, and if the proper position display units A are installed at the front part of the movable stand, and the mobile robot 3 in an automatic mode travels autonomously, the proper position display units A are mistakenly detected as obstacles. Another reason is that interference with the proper position display units A should be avoided when a rear door D of the container C is opened and closed at the time of the load handling operation by the mobile robot 3.

Figure 6:
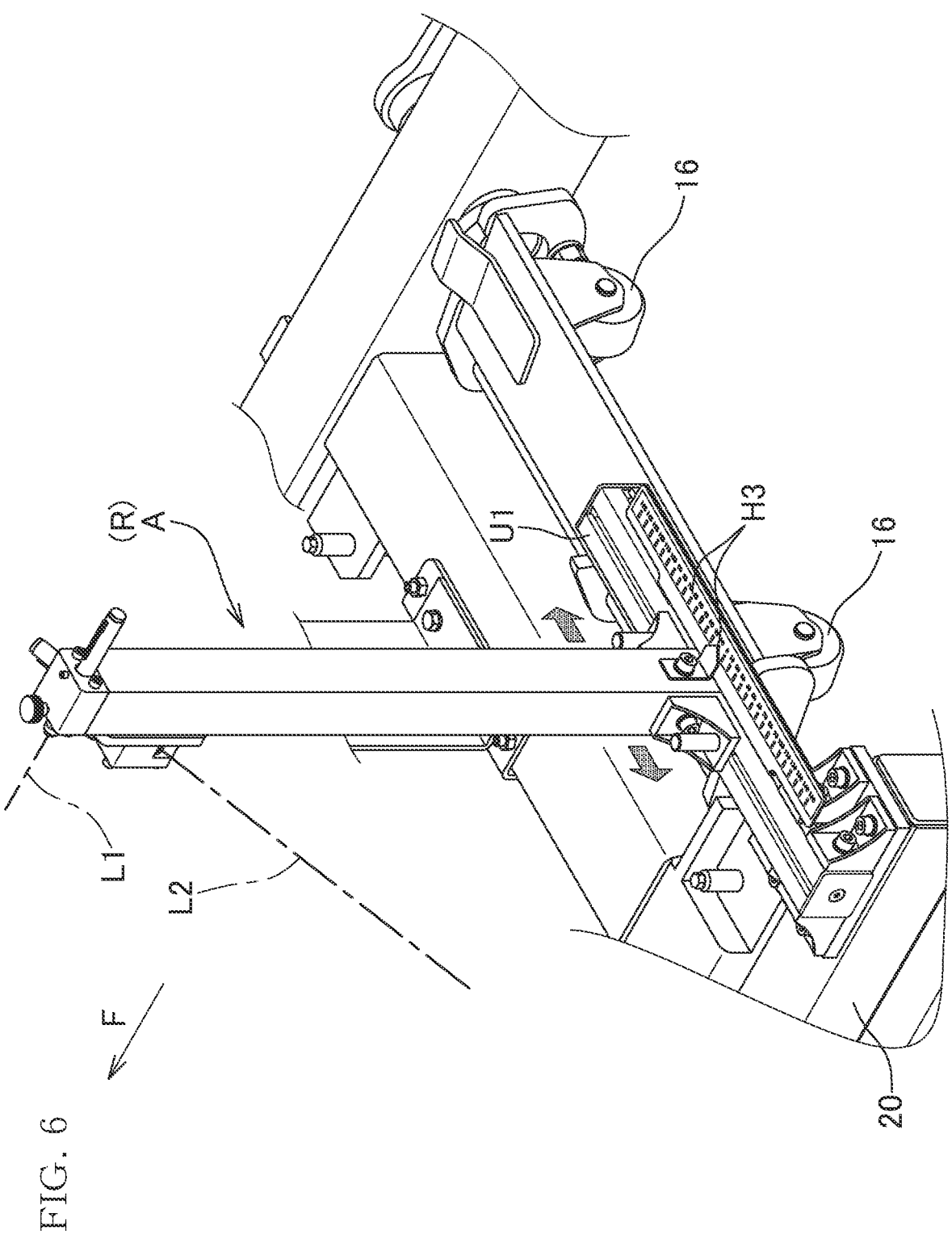
FIG. 6 is an enlarged view of a main part around the proper position display unit.

As shown in FIGS. 5 and 6, each of the proper position display units A includes a first display H1, a second display H2, and a third display H3.

(First Display)

Each of the first displays H1 emits a first light L1 to the front F from a laser pointer using a semiconductor laser, for example, and displays a position G1 of the first light L1 on the rear surface E when the first light L1 hits the rear surface E of the container C. The first light L1 is emitted using the laser pointer to display the position G1 at which the first light L1 hits the rear surface E of the container C, thereby displaying the position G1 more quickly and accurately with high visibility.

(Second Display)

Each of the second displays H2 emits a second light L2 to the movable stand 11 from a laser pointer using a semiconductor laser, for example, and displays a proper position of the mobile robot 3 relative to the position of the proper position display units A. The proper position of the mobile robot 3 is a position G2 at which the second light L2 hits the movable stand 11. The second light L2 is emitted using the laser pointer and the position G2 at which the second light L2 hits the movable stand 11 is displayed, thereby displaying the position G2 more quickly and accurately with high visibility.

(Third Display)

The third displays H3 display, when the proper position display units A are moved, an amount of the movement of the proper position display units A in the left-right direction so that the position G1 on the rear surface E of the container C, which is hit by the first light L1 emitted to the front F from each of the first displays H1, is a predetermined position M on the rear surface E. Each of the third displays H3 is, for example, an analog scale, as shown in FIG. 6.

FIG. 5 shows a state in which the mobile robot 3 is moved to a proper position relative to the position of the container C by using the proper position display units A. In this state, the position G1 at which the first light L1 hits the rear surface E of the container C coincides with the predetermined position M on the rear surface E of the container C. In the present embodiment, the predetermined position M on the rear surface E is the center in the left-right direction of a frame that supports the rear door D.

(Placement of Mobile Robot at Proper Position Relative to Proper Position Display Unit)

In the state shown in FIG. 3, the left and right proper position display units A are respectively at reference positions determined relative to the part of the movable stand 11, on which the mobile robot 3 is placed. It is necessary to place the mobile robot 3 at a proper position relative to the positions of the proper position display units A.

In order to place the mobile robot 3 at the proper position, the mobile robot 3 is moved aiming at the position G2 that has been hit by the second light L2 from the second display H2 of each of the proper position display units A, or a reference position in the left-right direction, which is indicated by a predetermined line K, a mark, and the like, shown in FIG. 3. To move the mobile robot 3, for example, the mobile robot 3 is set in a manual mode and moved by a manual operation. FIG. 4 shows a state in which the mobile robot 3 is placed at the proper position relative to the positions of the proper position display units A.

(Placement of Mobile Robot in Proper Position Relative to Container)

When the container truck B is parked on the truck berth T in front of the movable stand 11 and mobile robot 3 shown in FIG. 4, a relative positional misalignment between the container C of the truck B and the mobile robot 3 in the left-right direction often occurs. In that state, the position G1 at which the first light L1 emitted from each of the first displays H1 of the proper position display units A toward the front F hits the rear surface E of the container C is misaligned from the predetermined position M on the rear surface E of the container C in the left-right direction. Alternatively, the first light L1 does not hit the rear surface E of the container C.

The proper position display units A are movable in the left-right direction. Accordingly, the proper position display units A are moved in the left-right direction, thereby easily aligning the position G1 at which the first light L1 hits the rear surface E of the container C with the predetermined position M on the rear surface E of the container C.

If the proper position display units A are moved in the left-right direction, the position G2 at which the second light L2 emitted from each of the second displays H2 of the proper position display units A hits the movable stand 11 also moves. This is because a distance in the left-right direction between each of the proper position display units A and the position G2 hit by the second light L2 is set to be always constant. The mobile robot 3 is put into a manual mode, and is manually moved aiming at the position G2 of the second light L2 on the movable stand 11. Accordingly, the mobile robot 3 can be quickly positioned at the proper position relative to the container C.

When the container truck B is parked on the truck berth T in front of the movable stand 11 and the mobile robot 3, the container C of the truck B and the mobile robot 3 may not be misaligned in the left-right direction relative to each other. In such a case, it is natural that the movement of the proper position display units A in the left-right direction and the positioning of the mobile robot 3 are not needed. The proper position display units A can check whether the mobile robot 3 is in the proper position.

The mobile robot 3 may be moved to the proper position relative to the container C automatically, instead of using the manual mode. That is, the mobile robot 3 may be allowed to recognize the position G2 at which the second light L2 hits the movable stand 11, and to move automatically to the position G2 which is displayed by the second display H2.

However, a problem described below, which occurs when the mobile robot 3 is moved in the automatic mode, can be resolved by manually moving the mobile robot 3. Accordingly, it is a more preferable embodiment to move the mobile robot 3 manually. When the mobile robot 3 is moved in the automatic mode and performs a positioning operation, the mobile robot 3 may wander and approach peripheral devices. This may cause the obstacle sensor S to operate and recognize the peripheral devices as obstacles and stop the mobile robot 3.

<Example of Preparation Before Load Handling Operation Performed by Mobile Robot>

Figure 7:
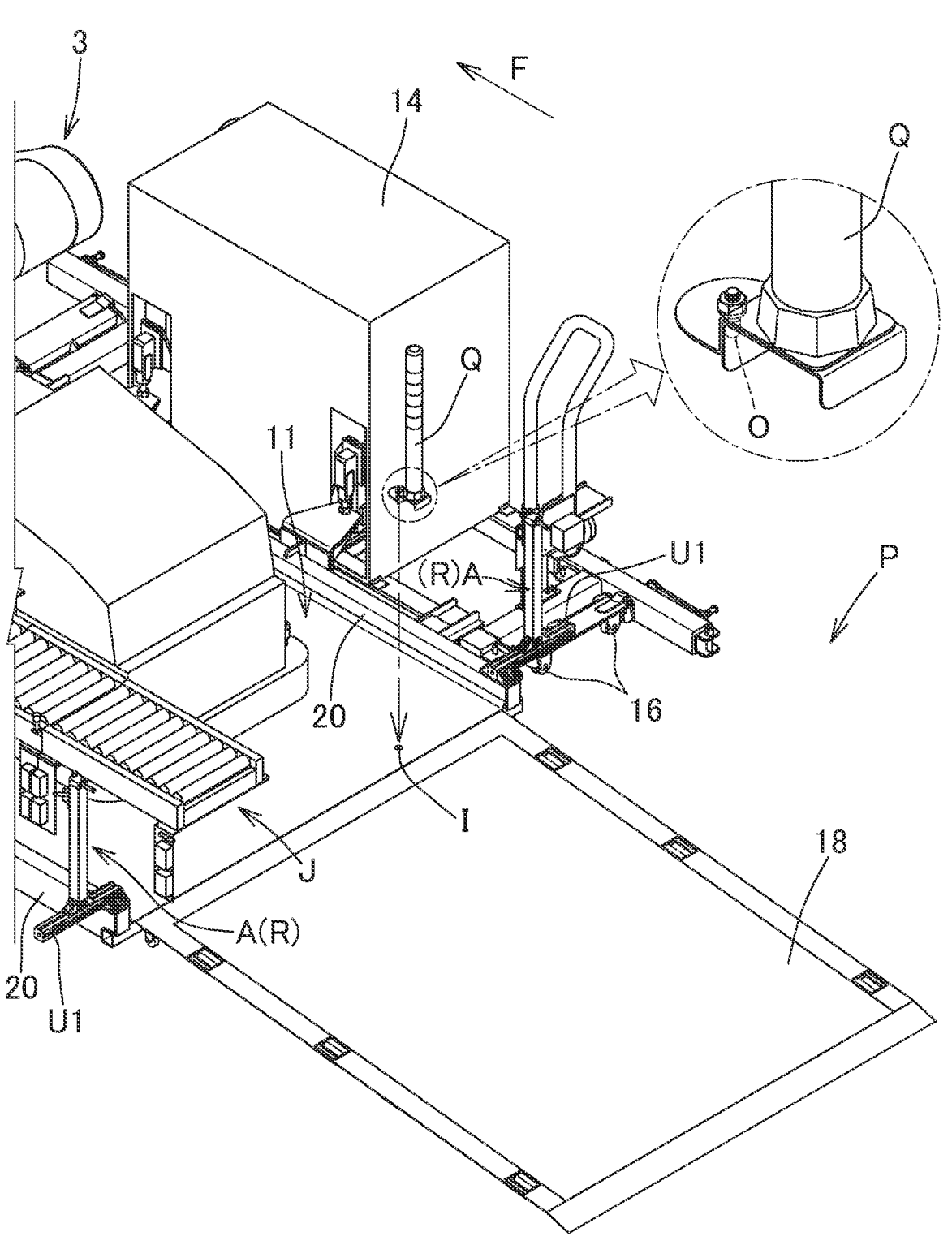
FIG. 7 is a perspective view showing an example of a method of attaching a rearward falling prevention reflector.

After the mobile robot 3 is placed at a proper position relative to the container C, the above-described extendable conveyor is connected to the vehicle-mounted conveyor J. Then, the rear door D of the container C is opened, and the movable stand 11 is lifted by the lifting device 14. Subsequently, a flap 19 is rotated forward from the position shown in FIG. 5 to be extended to the floor surface of the container C, and then the height of the movable stand 11 is adjusted by the lifting device 14 so that the flap 19 is in a horizontal state. Thereafter, as shown in FIG. 7, a pin O of the rearward falling prevention reflector Q is inserted into an attachment hole I of the movable stand 11. With these steps, preparations before the mobile robot 3 in the automatic mode autonomously travels and performs the load handling operation are completed.

The rearward falling prevention reflector Q is provided at the rear of the mobile robot 3. Accordingly, the laser scanner 10B of the unmanned transport vehicle 4 of the mobile robot 3 detects, in its detectable area, the rearward falling prevention reflector Q, thereby preventing the unmanned transport vehicle 4 from moving rearward and dropping from the slope 18.

In the above description, when the mobile robot 3 is placed at the proper position relative to the container C using the proper position display units A, the first display H1 of each of the proper position display units A emits the first light L1 to the front F with the rear door D of the container C shown in FIG. 5 being closed, and displays the position G1 of the light L1 on the rear surface E of the container C. Then, as in the example of the preparation before the load handling operation, the mobile robot 3 is placed at the proper position relative to the container C, and thereafter the rear door D of the container C is opened.

The rear door D of the container C may be opened before the first displays H1 of the proper position display units A emit the first light L1 to the front F. Even in that case, the first displays H1 of the proper position display units A emit the first light L1 to the front F, and display the position G1 of the first light L1 that hits the rear surface E of the container C. The predetermined position M on the rear surface E is the center of the frame supporting the rear door D in the left-right direction. If the rear door D of the container C is opened before the first displays H1 of the proper position display units A emit the first light L1 to the front F, there is no need to open the rear door D of the container C in the preparation before the load handling operation to be performed by the mobile robot 3.

<Load Handling Operation>

After the preparation before the load handling operation is completed, the mobile robot 3 is put into the automatic mode, and the mobile robot 3 autonomously travels into the container C and performs the load handling operation. At a position where the mobile robot 3 starts the autonomous travelling, the mobile robot 3 is properly positioned with respect to the position of the container C by using the proper position display units A. Therefore, abnormal stoppage of the mobile robot 3 due to relative positional misalignment in the left-right direction between the container C and the mobile robot 3 can be prevented.

<Function of Proper Position Display Unit as Reflector>

A sticker that is highly reflective in all directions is attached to each of the proper position display units A. Thus, the proper position display unit A also functions as a reflector R that can be referred to as a reference position when the mobile robot 3 moves autonomously.

In other words, positions of the proper position display units A in the left-right direction, which function as the reflector R, are determined with respect to the position of the container C, in a state where the proper position display units A are moved in the left-right direction so that the position G1 at which the first light L1 from each of the first displays H1 hits the rear surface E of the container C matches the predetermined position M on the rear surface E of the container C. Therefore, the proper position display units A can be referred to as reference positions when the mobile robot 3 moves autonomously.

In this manner, the proper position display units A display the proper position of the mobile robot 3, relative to the position of the container C, where the mobile robot 3 starts autonomous traveling, and serves as a reference position when the mobile robot 3 autonomously travels. As a result, the mobile robot 3 can be quickly positioned at the proper position. In addition, the mobile robot 3 can travel toward the container C during the autonomous travelling while maintaining the proper position in the left and right direction, which is the position from which the autonomous traveling starts. Therefore, the mobile robot 3 can smoothly shift to the load handling operation.

A shape of the proper position display unit A that also functions as the reflector R, is not limited to a quadrangular pole as shown in FIG. 6, but may be a cylindrical pole or the like. Alternatively, the shape of the proper position display unit A may be an L-shape in plan view with two walls, having a first plane on a side of the container C and a second plane on a side of the movable stand 11. In that case, a sticker that strongly reflects in all directions is attached to each of the first plane and the second plane.

The mobile robot 3 memorizes a map of the container C. If the container C is fully loaded with the loads N, the mobile robot 3 cannot autonomously travel while relying on the memorized walls of the container C. In view of the above, the left and right proper position display units A installed outside the container C are provided with the function of the reflector R as described above, and these are registered on the map. Since the reflector R is a strong reflector, it can be registered on the map as a landmark (distinguishable from other objects).

Accordingly, even if the walls of the container C cannot be seen, the mobile robot 3 provided with the laser scanners 10A and 10B can autonomously run using the proper position display units A, which are the reflector R, as a reference. Specifically, when the mobile robot 3 autonomously travels, the front and rear laser scanners 10A and 10B measure a distance to the reflector R existing in the detectable range, and integrate distance data of both laser scanners 10A and 10B to compare the integrated data with the memorized position of the reflector R, thereby allowing the autonomous travelling to be performed while allowing the mobile robot 3 to accurately grasp its own position and the misalignment of its posture in a direction of the rotation around a vertical axis.

In addition, if a certain area or more of the wall of the container C can be detected depending on an accommodation status of the loads N in the container C, the distance data to the wall of the container C within the detectable range is also acquired by the front laser scanner 10A and the rear laser scanner 10B. The above measurement data by the front laser scanner 10A and the measurement data by the rear laser scanner 10B are integrated and compared with the memorized positions of the wall and reflector R. With this operation, the mobile robot 3 can run autonomously while accurately grasping its own position and the misalignment of its posture in the direction of rotation around the vertical axis.

<When Amount of Positional Misalignment Cannot be Corrected Only by Moving Mobile Robot>

If the relative positional misalignment between the container C of the truck B and the mobile robot 3 in the left-right direction is large, an amount of movement of the proper position display units A in the left-right direction (a value of the amount is represented by X) for aligning the position G1 at which the first light L1 from each of the first displays H1 hits the rear surface E of the container C with the predetermined position M on the rear surface E of the container C increases.

If the proper position display units A are moved in the left-right direction, the position G2 at which the second light L2 emitted from each of the second displays H2 of the proper position display units A hits the movable stand 11 also moves. Accordingly, when the movement amount X is large, the mobile robot 3 cannot be moved to the proper position indicated by the position G2 by simply moving the mobile robot 3 on the movable stand 11 in the left-right direction. This is because the left and right frames 20 shown in FIGS. 4 and 5 restrict the movement of the mobile robot 3 in the left-right direction, for example.

The movement amount X for the proper position display units A in the left-right direction is displayed by each of the third displays H3 in FIG. 6. Accordingly, whether the movement of the mobile robot 3 in the left-right direction may be restricted can be confirmed by checking an exact value of the movement amount X.

If the value of the movement amount X displayed by each of the third displays H3 is larger than a predetermined value and the movement of the mobile robot 3 in the left-right direction is restricted, the movable stand 11 is movable in the left-right direction, as described above. Accordingly, if the situation is such that the movement of the mobile robot 3 to the left toward the proper position indicated by the position G2 is restricted, for example, the operating handle 17 is operated to ground the traversing wheels 16 so as to move the movable stand 11 to the left by the movement amount X.

After moving the movable stand 11 to the left by the movement amount X, the operating handle 17 is operated to ground the stopper-equipped casters 15, and to cause the stopper to fix the movable stand 11. In this state, the proper position display units A are moved in the left-right direction so that the position G1 at which the first light L1 from each of the first displays H1 hits the rear surface E of the container C is adjusted to the predetermined position M on the rear surface E of the container C. Then, the mobile robot 3 is moved to the position G2 at which the second light L2 from each the second displays H2 hits the movable stand 11. Accordingly, the mobile robot 3 moves to the proper position relative to the container C.

It should be noted that, after moving the movable stand 11 by the movement amount X, the container C and the mobile robot 3 may not be relatively misaligned in the left-right direction. In that case, it is natural that the movement of the proper position display units A in the left-right direction and the positioning of the mobile robot 3 are not needed. The proper position display units A can be used as means for checking whether the mobile robot 3 is in the proper position.

In the above description, an example is described, as shown in FIG. 4, in which the mobile robot 3 is placed on the movable stand 11 and moved at the proper position relative to each of the proper position display units A installed on the movable stand 11, and then the container truck B is parked on truck berth T. Here, the present invention is not limited to such an example.

That is, after the container truck B is parked on the truck berth T, the movable stand 11 is moved in accordance with the parking position, so as to be fixed thereto. Then, the mobile robot 3 may be placed at a proper position relative to the proper position display units A. Thereafter, the mobile robot 3 is positioned at a proper position relative to the container C of the truck B using the proper position display units A.

Alternatively, after the container truck B is parked on the truck berth T, the movable stand 11 is moved in accordance with the parking position, so as to be fixed thereto, and then, the proper position display units A are moved in the left-right direction to align the position G1 displayed on the rear surface of the container C by the first displays H1 with the predetermined position M. Thereafter, the mobile robot 3 may be moved from the slope 18 onto the movable stand 11, aiming at the position G2 displayed on the movable stand 11 by the second displays H2.

<Example of Installation of Proper Position Display Unit on Location Other than Movable Stand>

Figure 8:
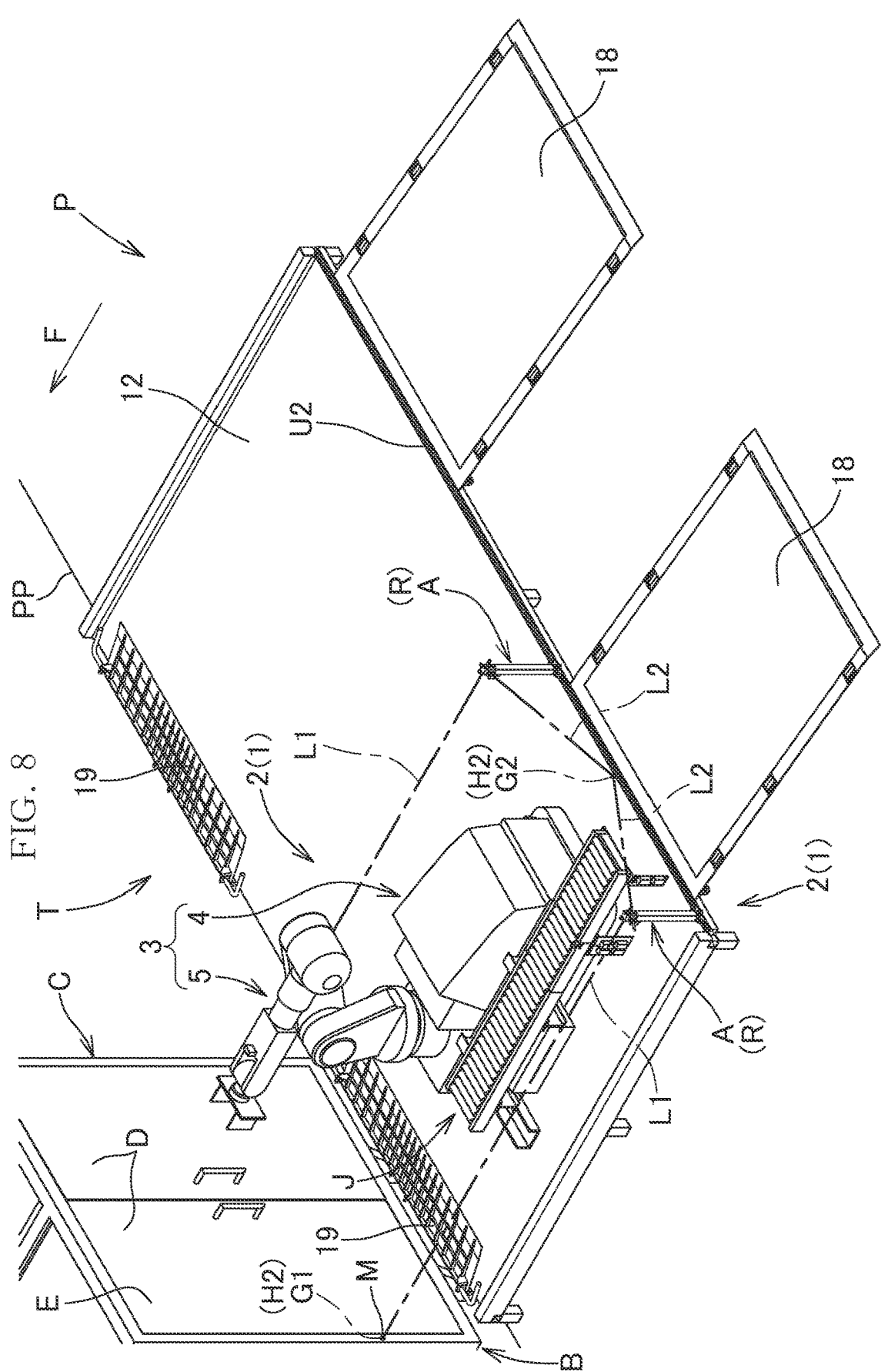
FIG. 8 is a perspective view showing an example in which the proper position display unit is provided on a fixed stand.

The proper position display unit A may be installed not on the movable stand 11 but on a fixed stand 12 as shown in FIG. 8. The proper position display unit A is supported by a left-right linear guide U2 provided on the fixed stand 12, and is therefore movable in the left-right direction.

Figure 9:
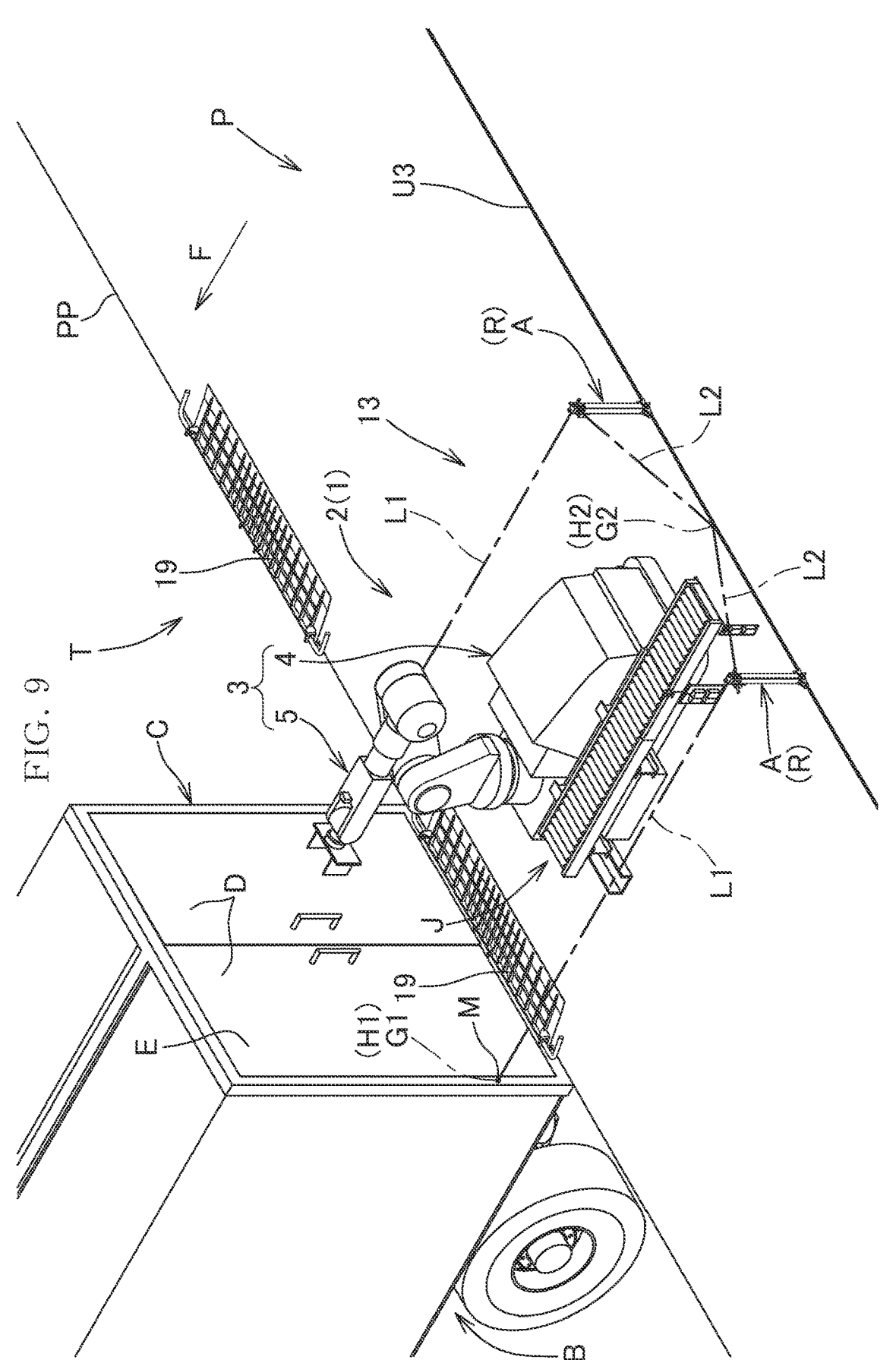
FIG. 9 is a perspective view showing an example in which the proper position display unit is provided on a floor surface.

The proper position display unit A may be installed not on the movable stand 11 or the fixed stand 12, but on a floor surface 13 as shown in FIG. 9. The proper position display unit A is supported by a left-right linear guide U3 provided on the floor surface 13, and is therefore movable in the left-right direction.

<Example of Load Handling Operation for Container Trucks Parked on Multiple Locations>

FIG. 8 shows an example in which the fixed stand 12, the proper position display units A, and the mobile robot 3 are commonly used at multiple positions (two positions in the example in FIG. 8) in the left-right direction of the container truck B parked on the truck berth T.

The proper position display units A are moved to the right along the linear guide U2, so that the proper position display units A can display a proper position of the mobile robot 3 relative to the position of the container C, for another container C of another truck B that is parked on the right side of the truck B shown in FIG. 8.

After the mobile robot 3 completes the load handling operation for the truck B shown in FIG. 8, the extendable conveyor (not shown) is removed from the vehicle-mounted conveyor J of the mobile robot 3, and the mobile robot 3 is moved to the right on the fixed stand 12.

FIG. 9 shows an example in which the proper position display units A and mobile robot 3 are commonly used at a plurality of positions (two positions in the example of FIG. 9) in the left-right direction of the container truck B parked on the truck berth T.

The proper position display units A are moved to the right along the linear guide U3, so that the proper position display units A can display a proper position of the mobile robot 3 relative to the position of the container C, also for another container C of another truck B that is parked on the right side of the truck B shown in FIG. 9.

After the mobile robot 3 completes the load handling operation for the truck B shown in FIG. 9, the extendable conveyor (not shown) is removed from the vehicle-mounted conveyor J of the mobile robot 3, and the mobile robot 3 is moved to the right on the floor surface 13.

When using the movable stand 11 as shown in FIG. 3, the movable stand 11 can freely move on the platform P in the front-rear direction, left-right direction, etc., with the stopper-equipped casters 15 being in contact with the ground. Even if the movable stand 11 is far away from the container truck B stopped at any location on the truck berth T, the movable stand 11 can be moved to the position of the container C of the container truck B. Then, the proper position of the mobile robot 3 relative to the position of the container C can be displayed by the proper position display units A installed on the movable stand 11 that has been moved to the proper position.

The above description of the embodiments is all illustrative and the present invention is not limited thereto. Various improvements and modifications can be applied to the present invention without departing from the scope of the present invention.

The invention claimed is:

1. A load handling system in which a load handling operation is performed between a platform and an inside of a container of a container truck, wherein
   a load handling device that performs the load handling operation includes a mobile robot provided with, on an unmanned transport vehicle, a robot with a robot arm that can handle a load;
   a proper position display unit is installed outside the mobile robot, and displays a proper position of the mobile robot relative to a position of the container of the container truck;
   the proper position is a position where the container and the mobile robot are not relatively misaligned in a left-right direction toward a front with a direction parallel to a direction along which the mobile robot approaches the container being the front,
   when the proper position displayed by the proper position display unit indicates that the mobile robot is placed at the proper position, the mobile robot autonomously travels to perform the load handling operation, and
   when the proper position displayed by the proper position display unit indicates that the mobile robot is misaligned in the left-right direction from the proper position, the mobile robot autonomously travels to perform the load handling operation after being aligned to the proper position,
   wherein the proper position display unit includes:
   a first display that emits a first light toward the front and displays, when the first light hits a rear surface of the container, a position of the first light that has hit the rear surface, and
   a second display that emits a second light to the stand or the floor surface, and displays the proper position of the mobile robot relative to a position of the proper position display unit, the proper position of the mobile robot being a position at which the second light has hit the stand or the floor surface.

2. The load handling system according to claim 1, wherein the proper position display unit:
   is installed on a stand or a floor surface, on which the mobile robot is placed; and
   is movable in the left-right direction relative to the front.

3. The load handling system according to claim 2, wherein the proper position display unit further includes a third display that displays, when the proper position display unit is moved, a movement amount of the proper position display unit in the left-right direction relative to the front so that the position on the rear surface, at which the first light emitted from the first display toward the front has hit, is a predetermined position on the rear surface.

4. The load handling system according to claim 1, wherein positioning of the mobile robot to the proper position relative to a position of the container includes movement of the mobile robot by a manual operation.

5. The load handling system according to claim 4, wherein the mobile robot is provided with an obstacle sensor that functions during an automatic mode.

6. The load handling system according to claim 1, wherein the proper position display unit has a function as a reflector that is referable as a reference position when the mobile robot travels autonomously, and
   when a position of the proper position display unit relative to a position of the container is misaligned from a predetermined position in the left-right direction relative to the front, the proper position display unit is moved in the left-right direction to be positioned at the predetermined position.

7. The load handling system according to claim 1, wherein the proper position display unit:
   is installed on a stand or a floor surface, on which the mobile robot is placed;
   is movable in a left-right direction relative to the front; and
   has a function as a reflector that is referable as a reference position when the mobile robot moves autonomously.

8. The load handling system according to claim 1, wherein the proper position display unit is installed on a movable stand on which the mobile robot is mounted, and a state of the movable stand is switchable between an immovably fixed state and a movable state in which the movable stand is movable in a left-right direction relative to the front with a direction parallel to a direction along which the mobile robot approaches the container being the front.

9. The load handling system according to claim 8, wherein the movable stand includes a stopper-equipped caster, the movable stand is fixed immovably by actuating the stopper, and the movable stand is allowed to be freely movable in a front-rear direction and a left-right direction, by releasing the stopper.

10. A load handling method for performing a load handling operation between a platform and an inside of a container of a container truck, wherein a load handling device that performs the load handling operation includes a mobile robot provided with, on an unmanned transport vehicle, a robot with a robot arm that can handle a load, the method comprising:

causing a proper position display unit to emit a first light, the proper position display unit being installed on a stand or a floor surface, on which the mobile robot is placed, the proper position display unit being movable in a left-right direction relative to a front with a direction parallel to a direction along which the mobile robot approaches the container of the container track being the front, and causing the proper position display unit to move in the left-right direction so that a position at which the first light has hit is a predetermined position on a rear surface of the container, when the position at which the first light has hit the rear surface is not the predetermined position on the rear surface;

causing the proper position display unit to emit a second light to the stand or the floor surface, and causing the proper position display unit to display a proper position of the mobile robot relative to a position of the proper position display unit, the proper position of the mobile robot being a position at which the second light has hit the stand or the floor surface;

allowing the mobile robot to autonomously travel into the container to perform the load handling operation, when the proper position displayed on the stand or the floor surface by the proper position display unit indicates that the container and mobile robot are not relatively misaligned in the left-right direction; and causing the mobile robot to move to the proper position and subsequently allowing the mobile robot to autonomously travel into the container to perform the load handling operation, when the proper position displayed on the stand or the floor surface by the proper position display unit indicates that the container and the mobile robot are relatively misaligned in the left-right direction.

* * * * *